US009682683B2

(12) United States Patent
Williams et al.

(10) Patent No.: US 9,682,683 B2
(45) Date of Patent: Jun. 20, 2017

(54) DETERMINING PROXIMITY OF A USER TO A VEHICLE USING A PLURALITY OF WIRELESS DEVICES

(71) Applicant: GM Global Technology Operations LLC, Detroit, MI (US)

(72) Inventors: Nathaniel H. Williams, Berkley, MI (US); Marco T. Carnevale, Windsor (CA); Amanda J. Kalhous, Ajax (CA); Dwayne A. Crocker, Lake Orion, MI (US); Samer Zakhem, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/884,370

(22) Filed: Oct. 15, 2015

(65) Prior Publication Data

US 2017/0106834 A1 Apr. 20, 2017

(51) Int. Cl.
*B60R 25/01* (2013.01)
*G07C 9/00* (2006.01)
*H04W 4/00* (2009.01)
*H04W 76/02* (2009.01)
*H04B 7/00* (2006.01)
*H04W 12/06* (2009.01)

(52) U.S. Cl.
CPC ........ *B60R 25/01* (2013.01); *G07C 9/00111* (2013.01); *H04W 4/008* (2013.01); *H04W 76/02* (2013.01); *H04W 76/023* (2013.01); *H04B 7/00* (2013.01); *H04W 4/00* (2013.01); *H04W 12/06* (2013.01)

(58) Field of Classification Search
CPC ..... H04W 12/06; H04W 4/008; H04W 76/02; H04W 76/023; H04W 4/00; B60R 25/102; B60R 25/01; G07C 5/008; G07C 9/00309; G07C 9/00111; H04B 7/00
USPC ...................... 340/5.61, 426.19, 426.13, 10.4
See application file for complete search history.

(56) References Cited

U.S. PATENT DOCUMENTS 9,253,803 B2 * 2/2016 Fyke .................... H04W 12/06

* cited by examiner

*Primary Examiner* — Ali Neyzari
(74) *Attorney, Agent, or Firm* — Christopher DeVries; Reising Ethington P.C.

(57) ABSTRACT

A communication system and method utilizing the communication system. The method includes performing a vehicle function based on a proximity of two wireless devices to a vehicle. The steps of method include: establishing a short-range wireless communication (SRWC) link between a SRWC system on the vehicle and a first wireless device; establishing another SRWC link between the SRWC system and a second wireless device, wherein the first and second wireless devices are associated with a common user; receiving a wireless signal at the SRWC system from each of the first and second wireless devices; determining a proximity of the two wireless devices based on receiving the wireless signals; and performing a vehicle function based on the determined location.

17 Claims, 4 Drawing Sheets

DETERMINING PROXIMITY OF A USER TO A VEHICLE USING A PLURALITY OF WIRELESS DEVICES

TECHNICAL FIELD

The present invention relates to determining a proximity of a vehicle user to a vehicle using a plurality of wireless devices.

BACKGROUND

An operator of a vehicle may use a mobile device to perform a variety of vehicle functions. For example, the mobile device may communicate with the vehicle to start the vehicle or unlock a vehicle door. It is desirable to be able to perform these and other vehicle functions based in part on the operator's proximity to the vehicle. However, with respect to determining the operator's proximity, greater accuracy than is presently available is needed in order to perform desirable functions and improve the operator's vehicle experience. Thus, there is a need for a communication system capable of providing greater accuracy and reliability with respect to the operator's proximity, location, or both.

SUMMARY

According to an embodiment of the invention, there is provided a method of performing a vehicle function based on a proximity of two wireless devices to a vehicle. The method includes the steps of: establishing a short-range wireless communication (SRWC) link between a SRWC system on the vehicle and a first wireless device; establishing another SRWC link between the SRWC system and a second wireless device, wherein the first and second wireless devices are associated with a common user; receiving a wireless signal at the SRWC system from each of the first and second wireless devices; determining a proximity of the two wireless devices based on receiving the wireless signals; and performing a vehicle function based on the determined location.

According to another embodiment of the invention, there is provided a method of performing a vehicle function based on a proximity of two wireless devices to a vehicle. The method includes the steps of: establishing a short-range wireless communication (SRWC) link between a Bluetooth Low Energy (BLE) system and a first wireless device, wherein the SRWC link is established via a plurality of BLE sensors located on the vehicle; establishing a SRWC link between the BLE system and a second wireless device, wherein the SRWC link is established via the plurality of BLE sensors; receiving a wireless signal at the BLE system from each of the first and second wireless devices via the plurality of BLE sensors; determining a proximity of a user associated with the two wireless devices by averaging the signal strengths of the wireless signals received in the receiving step; and performing a vehicle function based on the proximity determination.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The communication system described below pertains to communications between a vehicle short range wireless communication (SRWC) system (e.g., a Bluetooth Low Energy (BLE) system) and two or more wireless devices that are associated with a single user. The SRWC system receives wireless signals from each of these devices and uses these devices to determine the proximity or location of the user. In some aspects, the communication system uses the wireless signal strength of the devices to determine proximity/location/etc.; however, other techniques also are described. In addition, when two signal strengths are used, the system may perform one or more mathematical computations using the signal strengths to arrive at a more accurate proximity/location/etc. (e.g., calculating an average, a mean, etc.). In addition, where one or more signal strengths are too weak, these may be eliminated from any determination of the user's proximity/location/etc.

Following a description of the communication system and the BLE system, one or more embodiments of this summarized method will be described in greater detail below.

Communications System—

Figure 1:
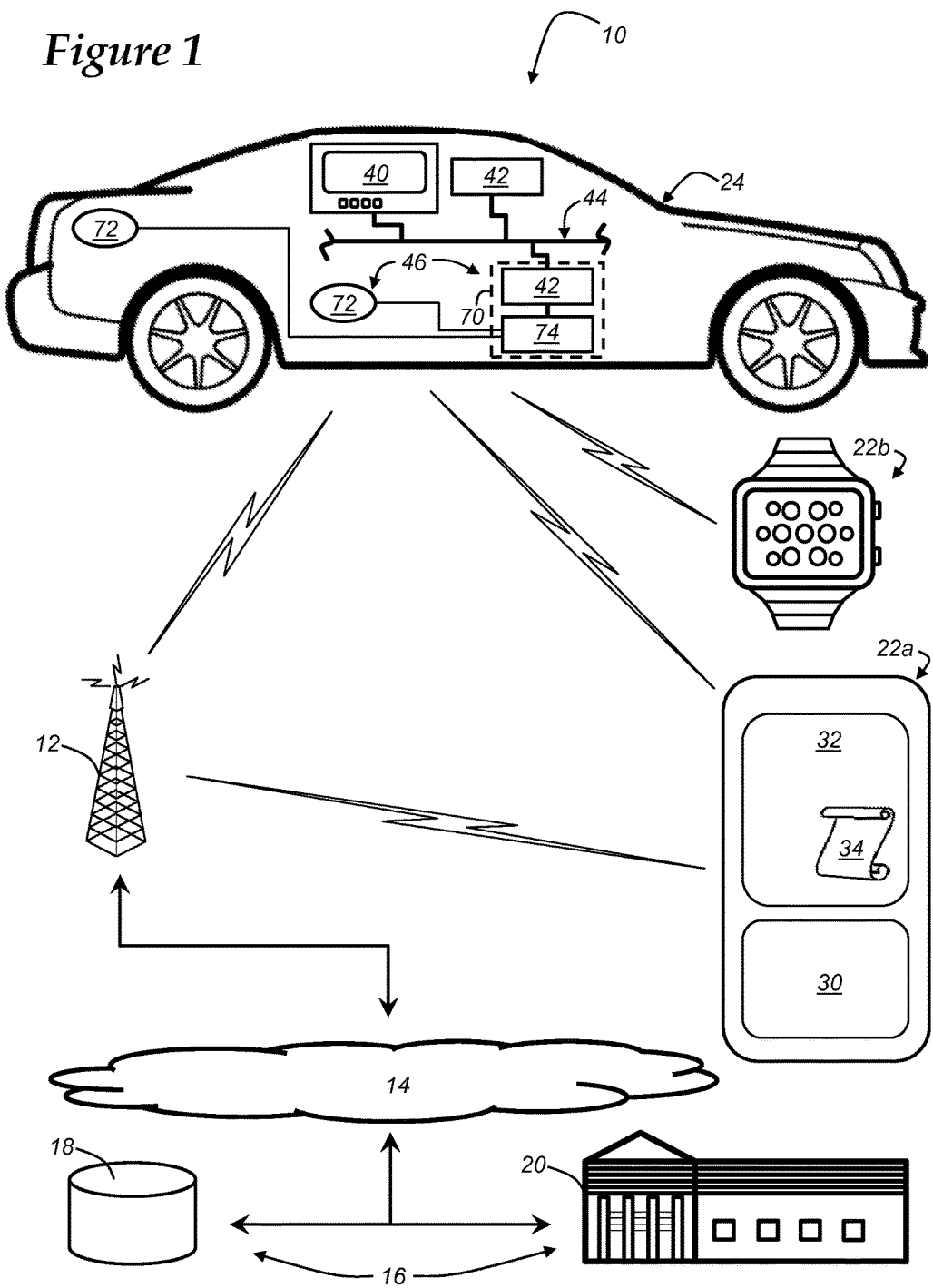
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16 that includes at least one of a remote server 18 or a data service center 20; two or more wireless devices 22a, 22b; and a vehicle 24. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that includes a plurality of cell towers (only is one shown), one or more mobile switching centers (MSCs) (not shown), as well as any other networking components required to connect wireless carrier system 12 with land network 14. Each cell tower includes sending and receiving antennas and a base station, with the base stations from different cell towers being connected to the MSC either directly or via intermediary equipment such as a base station controller. Cellular system 12 can implement any suitable communications technology, including for example, analog technologies such as AMPS, or the newer digital technologies such as LTE, CDMA (e.g., CDMA2000), or GSM/GPRS. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 14 may be a conventional land-based telecommunications network that is connected to one or more landline telephones and connects wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

Remote server 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from the vehicle 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 24 or data service center 20, or both. Remote server 18 can also be used for providing Internet connectivity such as DNS services or as a network address server that uses DHCP or other suitable protocol to assign an IP address to the vehicle 24.

Data service center 20 is designed to provide the vehicle 24 with a number of different system back-end functions and generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used.

Wireless devices 22a, 22b (FIG. 1) may be mobile electronic devices capable of cellular voice and/or data calls across a wide geographic area where transmissions are facilitated by the wireless carrier system 12. They may be configured to provide cellular services according to a subscription agreement with a third-party facility such as a wireless service provider (WSP). Wireless devices 22a, 22b may be electronically coupled to the vehicle 24 by wire or wirelessly via short-range wireless communication (SRWC) protocol (e.g., Wi-Fi Direct, Bluetooth, Bluetooth Low Energy (BLE), Near-Field Communication (NFC), etc.). Thus, as used herein, wireless devices may communicate via cellular communication, short range wireless communication, or a combination thereof Wireless devices 22a, 22b may include (see for example, FIG. 1, device 22a) a user interface coupled to a processor 30 which is configured to execute an operating system (OS) stored on device memory 32 (e.g., on a non-transitory computer readable medium of the device). The processor 30 further may execute one or more software applications 34 stored in device memory as well. Using such applications, a vehicle user may remotely control or communicate with vehicle 24, the backend system 16, or both (e.g., via cellular communication, SRWC, or both). It should be appreciated that any suitable wireless device (e.g., including but not limited to device 22b) may comprise a similar processor, memory, software, etc. In one embodiment, software application 34 may enable the user to remotely lock/unlock vehicle doors, turn the vehicle on/off, check the vehicle tire pressures, fuel level, oil life, etc. Thus, according to one embodiment, application 34 may perform at least some of the method steps described herein—e.g., providing a wireless signal used by vehicle 24 to determine the proximity of a vehicle user—as will be described in greater detail below.

Figure 2A:
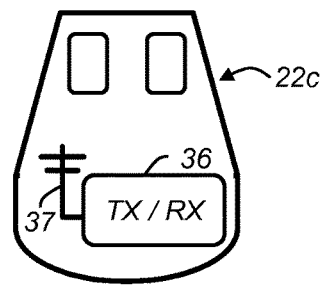
FIGS. 2A-2B illustrate examples of wireless devices.
Figure 2B:
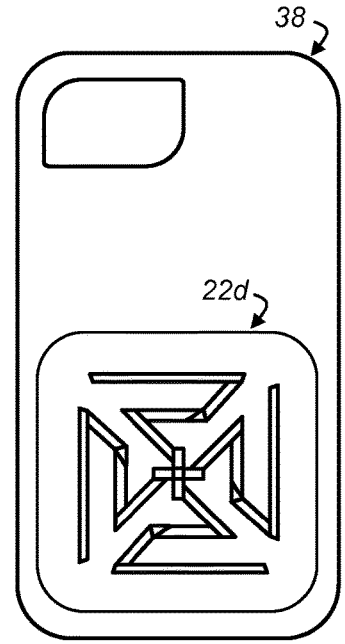

Some non-limiting examples of the wireless devices 22a, 22b include a Smart phone or mobile device (e.g., 22a), a Smart watch (e.g., 22b), a portable wireless transceiver 22c (see FIG. 2A), a radio frequency (RF) transponder tag or label (see FIG. 2B), a cellular telephone, a personal digital assistant (PDA), a personal laptop computer or tablet computer having two-way communication capabilities, a netbook computer, a notebook computer, or any suitable combinations thereof Wireless device 22c is embodied as a vehicle key fob that includes a transceiver suitably adapted to communicate with vehicle 24 via a SRWC protocol such as Bluetooth, Bluetooth Low Energy (BLE), Wi-Fi, or Near-Field Communication (NFC). The device 22c may include any suitable software, circuitry 36, or both, as well as an antenna 37 adapted to communicate with vehicle 24.

Wireless device 22d is embodied as an radio frequency identification (RFID) tag adhered to a mobile device case (or accessory) 38. RFID tags may include an integrated chip that includes one or more inlayed traces and an antenna. In the presence of a suitable RF signal, these tags can behave as a transponder and provide an automatic RF response signal. Thus, RFID tags may be configured to transpond in the presence of a SRWC signal (e.g., a Bluetooth signal, Bluetooth Low Energy (BLE) signal, Wi-Fi signal, or Near-Field Communication (NFC) signal—just to name a few non-limiting examples).

Wireless devices 22a, 22b, 22c, 22d may be used inside or outside of vehicle 24 by a vehicle user who may be a vehicle driver or passenger. It should be appreciated that the user does not need to have ownership of the wireless devices 22a, 22b, 22c, 22d or the vehicle 24 (e.g., the vehicle user may be an owner or a licensee of the wireless devices, the vehicle, or both).

Returning to FIG. 1, vehicle 24 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 may include a number of electrical components, including but not limited to a vehicle infotainment unit 40 and one or more vehicle system modules 42. Some components, such as the VIS 40 and VSMs 42 may be coupled to one or more network connections 44 (e.g., a bus, as will be described below). In addition, at least one VSM 42 may be part of a vehicle SRWC system 46 (e.g., a vehicle BLE system) which is used to carry out at least a portion of the method described herein.

Vehicle infotainment system (VIS) 40 may comprise a user interface and display and may be used to provide a number of vehicle services to users of vehicle 24 (e.g., non-limiting examples include audio data, video data, multimedia data, etc.). In at least one implementation (although not illustrated in FIG. 1), the SRWC system 46 is part of the infotainment system (e.g., it is associated with a center stack module or CSM in vehicle 24).

Figure 3:
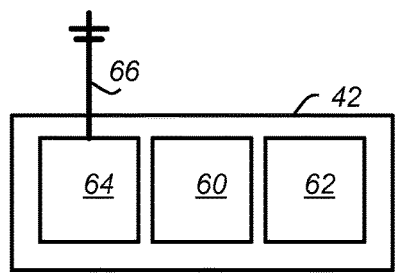
FIG. 3 is a schematic diagram of a vehicle system module (embodied as a vehicle telematics unit)

Vehicle system modules (VSMs) 42 may be any suitable hardware modules in the vehicle configured to perform one or more different vehicle functions or tasks—each VSM 42 having one or more processors 60 and memory devices 62, as illustrated in one example (shown in FIG. 3). The VSM 42 in FIG. 3 is a vehicle telematics unit having at least one communication circuit 64 and antenna 66. The communication circuit 64 may include one or more wireless chipsets and may enable the vehicle 24 to perform cellular communication over wireless carrier system 12, short range wireless communication (SRWC) with devices such as wireless devices 22a, 22b, 22c, 22d, or any combination thereof. Of course, a telematics unit is merely an example of a VSM. It will be appreciated that other VSMs 42 may not have communication circuits 64 or antennas 66 (and may have other suitable features instead). Non-limiting examples of VSMs include: an engine control module (ECM) that controls various aspects of engine operation such as fuel ignition and ignition timing; a powertrain control module (PCM) that regulates operation of one or more components of the vehicle powertrain; and a body control module (BCM) that governs various electrical components located throughout the vehicle, like the vehicle's power door locks and headlights. According to one embodiment, the ECM is equipped with on-board diagnostic (OBD) features that provide a myriad of real-time data, such as that received from various sensors including vehicle emissions sensors, and provide a standardized series of diagnostic trouble codes (DTCs) that allow a technician to rapidly identify and remedy malfunctions within the vehicle.

Returning to FIG. 1, network connections 44 include any wired intra-vehicle communications system for connecting or coupling the VSMs 42 and other vehicle electronic devices to one another. According to one embodiment, the network connection 44 comprises a data bus (e.g., a communication bus, entertainment bus, etc.). Non-limiting examples of suitable network connections include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few.

Figure 4:
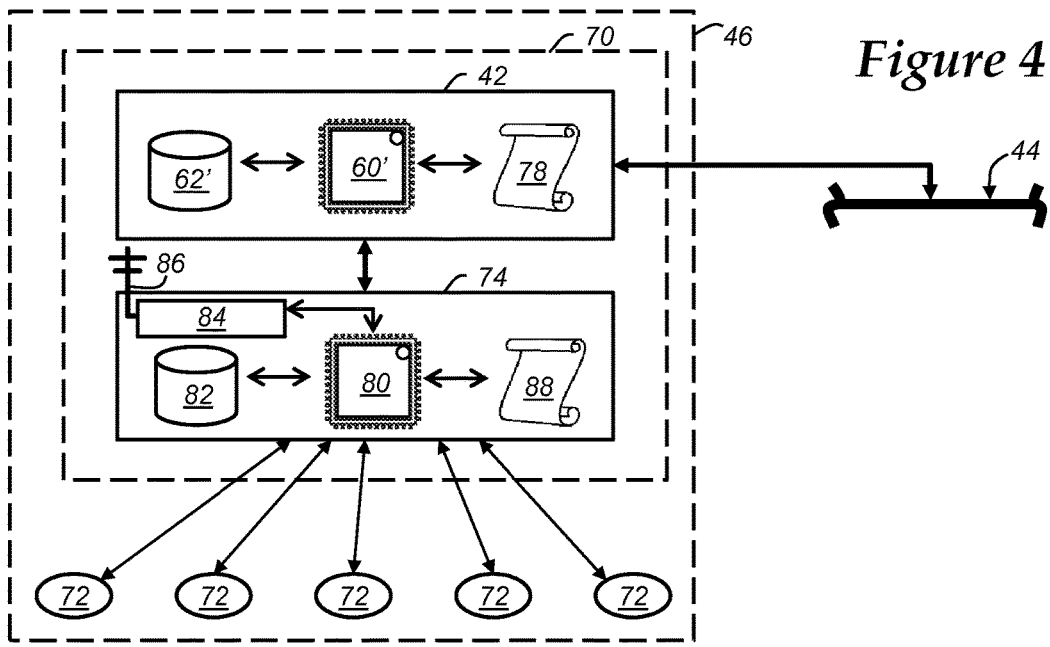
FIG. 4 is a schematic diagram of a vehicle Bluetooth Low Energy (BLE) system.

SRWC system 46 can comprise any suitable components for communicating with intra- and extra-vehicle devices over a SRWC protocol. In at least one example (and as described hereafter), the SRWC system 46 is a BLE system and utilizes the Bluetooth Low Energy (BLE) protocol. As shown in FIGS. 1 and 4, in at least one embodiment, the BLE system 46 comprises a BLE manager 70 and one or more sensors 72. The BLE manager 70 comprises at least one VSM 42 and a central BLE module or node 74. The VSM 42 and central BLE module 74 may be a single hardware unit or may be two separate, electrically coupled hardware devices which cooperatively work together to carry out at least some of the steps of the method described herein. For example, BLE manager 70 may receive wireless BLE data (via BLE module 74 from sensors 72), decipher the received data (at the BLE module 74 or VSM 42), and when appropriate, command vehicle 24 to perform a command associated with the received and deciphered data (via VSM 42 or another VSM). In at least one implementation, VSM 42 could be the ECM or the BCM previously described—by way of illustration and not limitation, the BCM is described below as part of the BLE manager 70. Of course, it should be appreciated that other VSMs 42 also could be used with the BLE manager 70 (instead of or in addition to the BCM).

The BCM 42 shown in FIG. 4 is coupled to bus 44 and includes a processor 60', memory 62', and operational instructions 78 (which may be embodied as software programs, firmware programs, or the like). The processor 60' can be any type of device capable of processing electronic instructions including microprocessors, microcontrollers, host processors, controllers, vehicle communication processors, and application specific integrated circuits (ASICs). It can be a dedicated processor used only for BCM 42, or it can be shared with other vehicle systems. Processor 60' executes digitally-stored instructions 78, which may be stored in memory 62', which enable the BCM 42 to perform one or more vehicle functions (e.g., to actuate vehicle ignition (power ON or power OFF, to actuate vehicle door locks (lock or unlock), to actuate a vehicle panic alarm (ON or OFF), or to actuate a vehicle door, trunk, or hood (open or close), just to name a few non-limiting examples). Other instructions executable by processor 60' include determining the location or proximity of one or more of the wireless devices 22a, 22b, 22c, 22d, as will be described in greater detail below. Thus, processor 60' can execute programs or process data to carry out at least a part of the method discussed herein.

The memory 62' may include any non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

In FIG. 4, BLE module 74 is shown coupled to BCM 42 and the one or more sensors 72. BLE module 74 also may comprise a processor 80, memory 82, and digitally-stored instructions 88 (e.g., software programs, firmware programs, or the like). Processor 80 and memory 82 may be of similar type and may have similar characteristics and qualities as that of processor 60' and memory 62', and therefore will not be explained in greater detail. For example, memory 82 also may be a non-transitory computer readable medium. However, it will be appreciated that processor 80 and memory 82 may be specially adapted to carry out the processes and methods associated with BLE module 74 (rather than the BCM previously described). In at least one embodiment, the computing or processing power of the BLE module 74 may be substantially less than that of the BCM 42; accordingly, the processor 80 and memory 82 may be sized smaller than the processor 60' and memory 62'. Also, in at least one embodiment, the processor(s) 80 and memory 82 may execute one or more steps of the method embodiments contemplated herein. For example, the method(s) may be performed as one or more computer programs executable by one or more computing devices of or in communication with the BLE module 74 to cause the BLE module and/or its respective computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files.

In addition, BLE module 74 may include a transceiver 84 and antenna 86. The transceiver 84 and antenna 86 may be adapted to communicate wirelessly with one or more of the sensors 72. In some implementations, the transceiver 84 is adapted to receive signal data from the sensors 72 (wirelessly or by wire) and then transmit that signal data to the BCM 42 (e.g., by wire). In other implementations, the transceiver 84 is adapted to transmit signal data to sensors 72 (wirelessly or by wire) so that the sensors 72 may re-transmit the signal data (e.g., to wireless devices 22a, 22b, 22c, 22d). Thus, while FIG. 1 illustrates the sensors 72 being wired to the BLE module 74, embodiments exist where the sensors 72 and BLE module 74 are in wireless communication instead.

Figure 5:
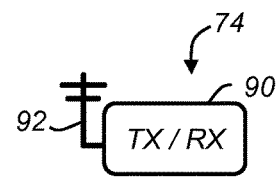
FIG. 5 is a schematic diagram of a vehicle sensor.

Sensor 72 may be any suitable sensor in the vehicle 24. Each sensor 72 may comprise a transmitter 90 and associated antenna 92 (see FIG. 5). In at least one implementation, the transmitter 90 is also a transceiver (e.g., capable of both transmitting and receiving wireless data). In at least on implementation, sensor(s) 72 are configured to communicate via the BLE protocol. In other implementations, the sensor(s) 72 may communicate via other protocols as well (e.g., Bluetooth). For example, in one implementation, sensor 72 is located in a door panel and is adapted to sense the proximity of one or more of the wireless devices 22a, 22b, 22c, 22d via BLE (e.g., via a signal strength, as explained more below). In another implementation, a sensor 72 may be adapted for one-way or two-way communication with any one of the wireless devices 22a, 22b, 22c, 22d via BLE or another SRWC protocol. Thus, in at least some implementations, sensors 72 can be configured for communicating via multiple protocols.

Figure 6:
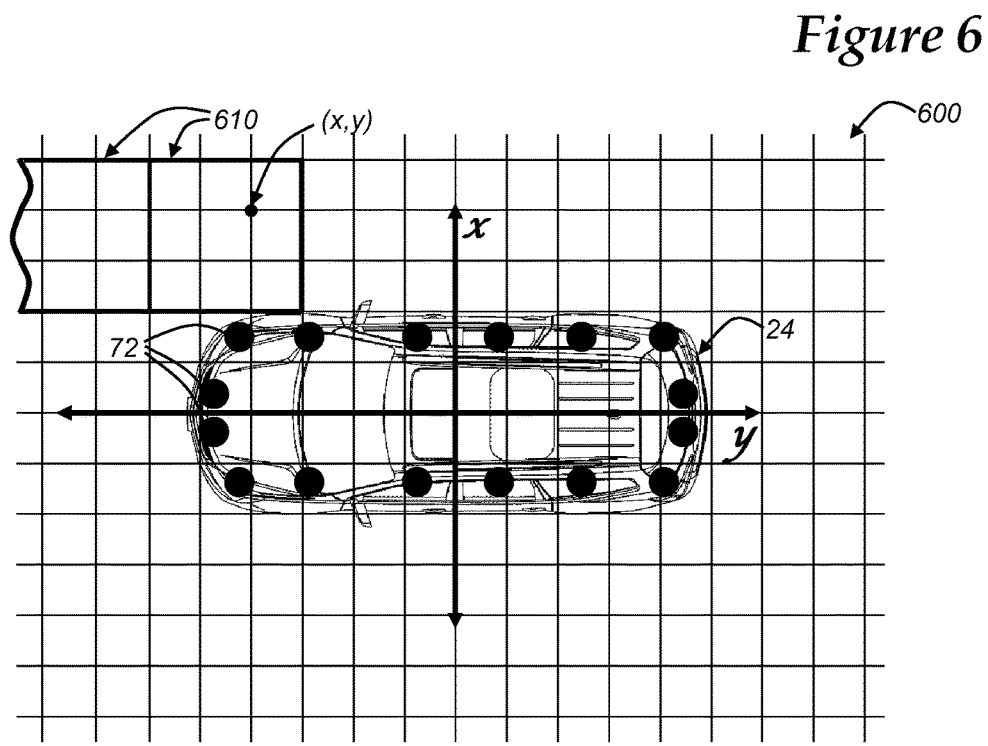
FIG. 6 is a schematic diagram of a vehicle and a vehicle user having two wireless devices depicted on a coordinate plane.

In at least one vehicle embodiment, a plurality of sensors 72 are distributed in different regions of the vehicle (see FIG. 6). Here, sixteen sensors are shown distributed through the vehicle; however, this is merely an example (more or less may be used). For example, sensors 72 may be located fore and aft, driver side and passenger side, and/or therebetween. This distribution of sensors may provide redundancy, enable the BLE system 46 to determine the proximity or location of a user, or both.

It should be appreciated that while the BCM 42 is shown as part of the BLE system 46, this also is merely an example. For example, the ECM alternatively be part of the system 46. Or the BCM and ECM could both be part of the BLE system 46 (e.g., part of the BLE manager 70). Again, the BCM and ECM are merely examples; other VSMs 42 also could operate as part of the BLE manager 70.

Method—

Figure 7:
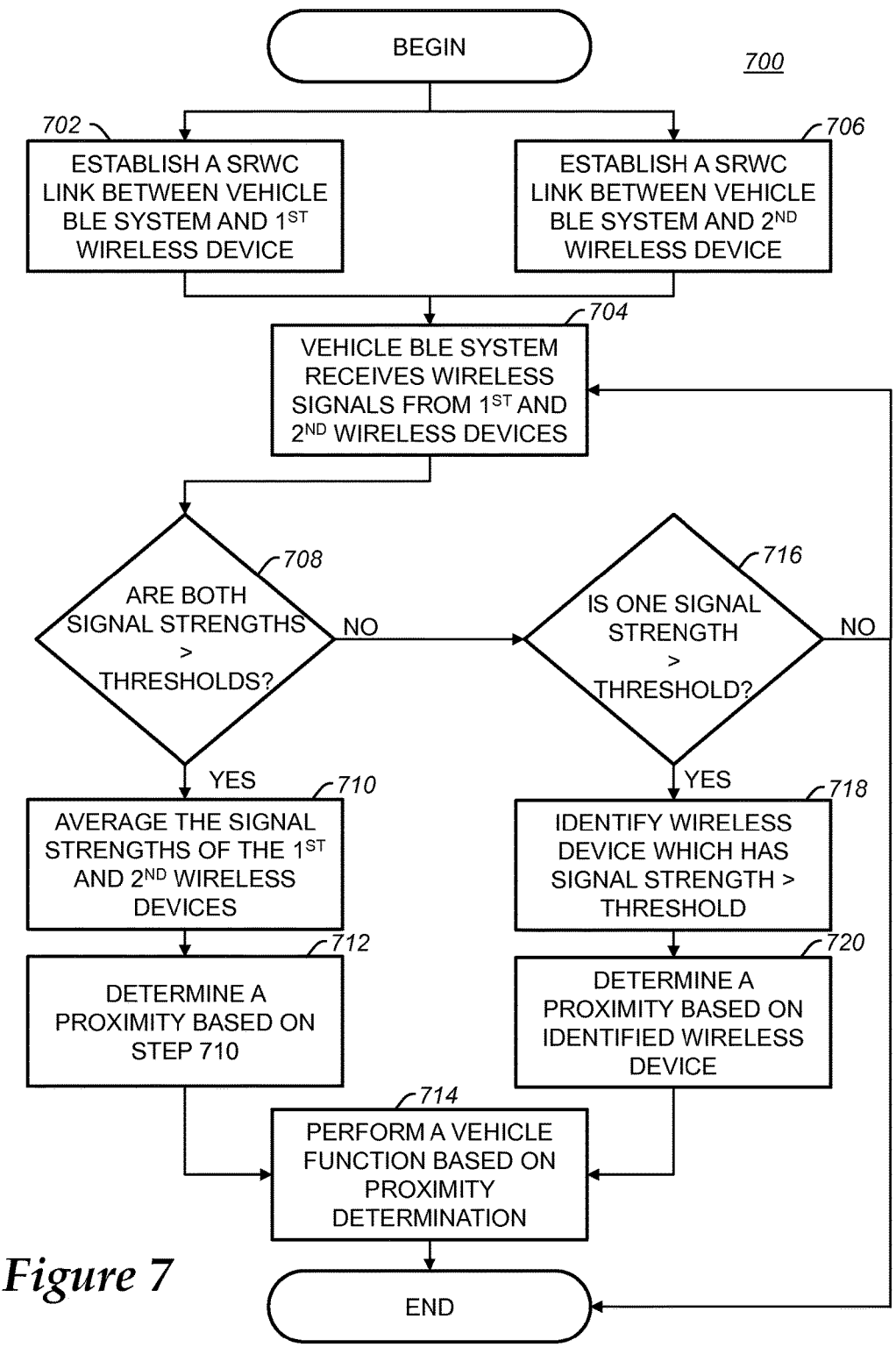
FIG. 7 is a flow diagram illustrating a method of using the BLE system shown in FIGS. 1 and 4.

Turning now to FIG. 7, there is a method 700 for performing a vehicle function based on a determined proximity (or location) using two or more wireless devices (22a, 22b, 22c, 22d) with respect to vehicle 24. As will be described below, the method pertains to vehicle users having two or more wireless devices (e.g., 22a, 22b, 22c, 22d). For the sake of clarity, wireless device 22a and 22b will be used to illustrate the method 700; however, it will be appreciated that devices 22c and 22d (as well as any other suitable wireless device) could also be used.

The method begins with step 702 in which a short range wireless communication (SRWC) link (e.g., a BLE link) is established between the BLE system 46 and wireless device 22a. In at least one implementation, the pairing of BLE system 46 and wireless device 22a occurs seamlessly; e.g., the system 46 and device 22a may be previously bonded (e.g., in accordance with security protocols and techniques known to skilled artisans) so that when device 22a is in the presence or proximity of BLE system 46, the pairing occurs automatically. During any previous bonding, wireless device 22a may identify itself by providing a wireless device parameter—e.g., an identifier of the device to the vehicle 24 (e.g., a mobile identification number or MIN is one example of a type of identifier which may provide wireless device characteristics, as described below). During bonding, e.g., the wireless device 22a may be associated with a particular user of vehicle 24. For example, the MIN of device 22a may be associated with a user identity so that upon detection of device 22a (in future instances), the vehicle presumes a particular user is using or proximate to vehicle 24 (based on this previous association). In one implementation, as part of the wireless linking or pairing, the wireless device 22a may send a wireless signal response to a ping provided by the BLE system 46 (e.g., which may be operating in a discoverable mode). Step 704 follows.

In step 704, when device 22a is sufficiently proximate to vehicle 24, the response signal of device 22a may be received by the BLE system 46. More specifically, the response signal of wireless device 22a may be received via one or more sensors 72, through the BLE module 74, and to the BCM 42. It should be appreciated that in some scenarios, the discoverable mode signal may be received by the wireless device 22a, but the response signal (from device 22a) may not be received by the BLE system 46 until the wireless device 22a is sufficiently proximate one of the vehicle sensors 72.

Step 706 may be substantially similar to step 702 and may occur sequentially or concurrently with steps 702 and/or 704. Of course in step 706, BLE system 46 and wireless device 22b establish a separate SRWC (or BLE) link therebetween. And when device 22b is sufficiently proximate to one of the vehicle sensors 72, the BLE system 46 (in step 704) receives a wireless response signal from the wireless device 22b. As in step 702, device 22b may be associated with a particular user—and more specifically, the same user as was associated with device 22a in step 702. Thus, this user uses or may carry two or more wireless devices (e.g., a Smart phone 22a and a Smart watch 22b). Following steps 702-706, method 700 proceeds to step 708.

In step 708, the BLE system 46 may determine whether each of the response signals (or any other wireless signal received from devices 22a, 22b in the interim) is larger than a threshold stored in BCM memory 62' or is larger than a threshold determined using the BCM processor 60'. In making this threshold determination, the BCM 42 may use the signal strength of wireless device 22a, the signal strength of wireless device 22b, a threshold associated with device 22a, and a threshold associated with device 22b. As will become apparent in the discussion below, in some implementations, the two thresholds may be identical or substantially similar (e.g., when the devices 22a, 22b are the same make and model), whereas in other implementations, the two thresholds may be different (e.g., when the device model numbers are different or when the devices model numbers are the same, however, the behavior of one of the devices is abnormal or unusual).

In one implementation of the BLE system 46, the BLE module 74 determines the wireless signal strength of the most recent wireless signal received from each device 22a, 22b. For example, BLE module instructions 88 executable by BLE module processor 80 may determine a signal strength value for each wireless signal (e.g., a received signal strength indication or RSSI). And the BCM 42 may receive these values from the BLE module 74.

With respect to the thresholds associated with devices 22a and 22b, in one implementation, the BCM 42 may determine a first threshold (for device 22a) and determine a second threshold (for device 22b). The first threshold may be determined using the identifier (e.g., the MIN) of device 22a, which may be stored in BCM memory 62'. For example, the identifier may assist the BCM 42 in identifying the manufacturer and model of the wireless device 22a. Based on the manufacturer and/or model information, the BCM 42 may obtain and/or refer to a stored wireless signal strength profile or look-up table (in memory 62'). The profile may include additional wireless signal parameters (e.g., in addition to an identifier). For example, the profile may comprise an expected range of wireless signal strengths, a threshold (or minimum) signal strength, as well as an associated proximity of device 22a based on signal strength (e.g., a look-up table having a variety of distances between device 22a and sensor 72 which received the signal, each associated with a different signal strength). This profile may be downloaded via the internet by the telematics unit or received at the telematics unit via the backend system 16 (or via any other suitable manner).

By way of illustration of how the profile may be used—a weak wireless signal strength associated with device 22a may be determined using the profile. For example, for a iPhone 6 Smart Phone, RSSI values generally may vary between 0-155 dB. Thus, a threshold (weak) value may be determined to be 55 dB; i.e., it may be determined that anything less than 55 dB is subject to too much environmental noise to be reliable. Thus, the first threshold may be based upon the type or characteristics of the wireless device. Further in step 708, using these illustrative values, the BCM 42 may determine that the wireless signal does not exceed the minimum threshold unless the wireless signal is greater than 55 dB.

Also in step 708, BCM 42 may perform a similar determination with respect to device 22b. In this example, wireless device 22b is a Smart watch. This different device may have different wireless signal characteristics (than device 22a). Thus (by way of example only), a minimum signal strength from device 22b may be 50 dB; however, a maximum expected signal strength may be 130 dB. Thus in step 708, the BCM 42 may determine that the wireless signal of device 22b does not exceed the minimum threshold unless the wireless signal is greater than 50 dB. If both the wireless signal strength of device 22a is greater than 55 dB and the wireless signal strength of device 22b is greater than 50 dB, then method 700 proceeds to step 710. And if the wireless signal strength associated with either of the wireless devices 22a, 22b is less than the respective thresholds, the method instead proceeds to step 716.

It should be appreciated that the BCM 42 could generate or 'learn' wireless device profiles as well. For example, the expected signal strength range could vary, the minimum threshold could vary, etc. This may occur as the BCM 42 interacts with devices 22a, 22b over time—e.g., receiving a number of wireless signal samples (e.g., having varying signal strengths). For example, BCM 42 may determine that, in at least some scenarios where environmental noise is minimized (e.g., in the user's home garage), a minimum threshold could be lowered (e.g., to 30 dB, to 40 dB, or the like). In such an implementation, the vehicle telematics unit (another VSM 42) could identify the vehicle's location by using GPS or by identifying a known wireless access point or WAP (e.g., the user's 'home network'). Similarly, larger signal strength values than expected may be encountered from one or more wireless devices 22a, 22b, etc. For example, a signal strength of 160 dB might be received from device 22a (e.g., when the expected maximum was only 155 dB). In such instances, BCM 42 may be configured to extrapolate an adjusted device profile based on a device which transmits at a higher than expected signal strength magnitude. Thus, when BCM 42 makes the determination in step 708, it may use values provided with a manufacturer specification, values acquired via empirical testing and then stored in vehicle memory (e.g., by the vehicle manufacturer), values determined by the BCM 42 using real-time data from the wireless device, or any combination thereof. These values may be received from backend system 16, via another computer server (e.g., like 18) via the wireless device (e.g., 22a, using application software thereon), etc.

In step 710, BCM 42 may average the signal strengths in order to perform step 712 (i.e., to determine the proximity of the user associated with both devices 22a, 22b). This may require normalizing at least one of the wireless signals prior to performing a mathematical averaging computation. For example, normalization may require adding and/or multiplying by constants so that all signal strength values fall between 0 and 1. Consider the following illustration where signal strength values of wireless device 22a may range between 0-155 dB and where the signal strength values of wireless device 22b may range between 0-130 dB—Table I illustrates a few exemplary signal strength values within these respective ranges for each device 22a, 22b; and the illustrated actual signal strength values have corresponding normalized values between 0 and 1. This table of course is merely meant to be an example and not to be limiting. Further, it should be appreciated that each of the values in Table I could be correlated to a spatial proximity of the respective wireless device to one of the sensors 72 on vehicle 24 (i.e., a signal strength parameter), as will be discussed in greater detail below.

TABLE I

| Wireless Device 22a | | | | | | | |
|---|---|---|---|---|---|---|---|
| Actual Signal Strength (dB) | 0 | 55 | 70 | 90 | 110 | 130 | 155 |
| Normalized Value | 0.00 | 0.35 | 0.45 | 0.58 | 0.71 | 0.84 | 1.00 |
| Wireless Device 22b | | | | | | | |
| Actual Signal Strength (dB) | 0 | 50 | 65 | 80 | 95 | 110 | 130 |
| Normalized Value | 0.00 | 0.38 | 0.50 | 0.62 | 0.73 | 0.85 | 1.00 |

Thus according to the values in Table I, if the BLE system 46 (e.g., BCM 42) received a wireless signal from device 22a having a value of 90 dB and also received a wireless signal from device 22b having a value of 80 dB, the BCM could average the associated normalized values. For example, (0.58+0.62)/2 or 0.60. Having performed the averaging, the method may then proceed to step 712.

It should be appreciated that normalizing may not always be required. For example, if both devices are identical (e.g., if both devices are of the same type and have identical model numbers), then the signals may be averaged without normalization in some implementations. For example, the averaged actual signal strength value could be used in step 712.

In step 712, the BCM 42 may determine a proximity of the user based on the average. As discussed above, this determination presumes that the two wireless devices are carried by the vehicle user (e.g., not being carried by two different persons). Step 712 may include comparing the normalized signal strength average of the two devices acquired in step 710 to a proximity value stored in memory 62' (e.g., a look-up table). For example, 0.60 in memory 62' may be correlated to a proximity of 20 meters from vehicle 24 (or more specifically, 20 meters from one of the plurality of sensors 72 on vehicle 24). While a single calculation has been described (with respect to one sensor 72, it will be appreciated that BCM 42 could perform this same determination with multiple sensors 72. Where three or more sensors 72 are used, the BCM 42 may triangulate a position (x, y) of the user based on the respective signal strengths (as shown in FIG. 6). Or the BCM 42 may determine a more general zone or region 610 defined by a predefined spatial area which may be adjacent vehicle 24 or spaced therefrom (as shown in FIG. 6). The process of determining the proximity (or more specifically, the region 610 or position (x, y)) of the user may be repeated during a time period (e.g., as the user approaches vehicle 24 or moves away therefrom). In this manner, the user's position may be used to assist in determining what vehicle function to perform (e.g., in step 714 which follows). For example, the user's speed may be calculated, the user's angle of approach may be determined, and even the user's arrival time at vehicle 24 may be predicted using these techniques and other similar techniques.

Step 710 or step 712 also may be used to determine that the wireless devices 22a, 22b are not being carried by the user (e.g., another passenger may be holding one of the devices as he/she approaches the vehicle 24 or one of the devices may be stationary while the other device is being carried, just to name a couple possibilities). Thus, there may be another threshold (e.g., a predetermined threshold) which is used to determine whether the devices 22a, 22b are or are not carried by the user. A difference of normalized values may be compared to this threshold. For example, if the normalized value associated with device 22a was 0.35 and the normalized value associated with device 22b was 0.85, the difference |0.35-0.85| or 0.50 may be larger than (i.e., exceeds) the predetermined threshold. BCM 42 may then conclude that, based on the normalized signal strengths, the two devices (although otherwise associated with a common user) are not both being carried by that user at this time. In the event the BCM 42 determines that the devices are not being carried by a common user, method 700 may end or the method then may rely upon only one signal (e.g., as will be described in step 718, 720, and 714).

Following step 712, the method proceeds to step 714 and performs a vehicle function based on the determined proximity (or position (x, y), region 610, etc.). For example in step 714, the method 700 may automatically unlock a particular vehicle door based on user position when the user reaches a predetermined proximity. Or the vehicle may open the trunk if the user is proximate the rear of the vehicle. Vehicle functions may be performed in conjunction with instructions received from the vehicle user as well. For example, the user also could send a command signal from the keyfob 22c or mobile device 22a (e.g. via application software 34 thereon). Or for example, a user command may take the form of a physical gesture (e.g., using hands, feet, etc.) which may be perceived by one or more proximity sensors, cameras, etc. on vehicle 24. Regardless of how a user command is received by vehicle 24 (e.g., BCM 42), the BCM may execute the command or instructions based on the command and based on the proximity/location of devices 22a, 22b. Other implementations will be apparent to skilled artisans.

Now turning to step 716, method 700 may proceed to step 716 from step 708 when both signal strengths do not exceed the associated thresholds discussed above. In step 716, the method may determine whether at least one of the signal strengths exceeds its respective threshold. This process may be similar to that described above. In addition, in at least one embodiment, the determinations made in step 708 do not need to be repeated; i.e., step 716 may be performed using the same previously received wireless signals and associated signal strengths and/or calculations. When only one signal strength exceeds the associated minimum threshold, then method 700 may proceed to step 718. When neither signal strength exceeds the associated minimum thresholds, then method 700 may either end or may loop back to step 704 and wait to receive additional wireless signals from devices 22a, 22b. In this latter instance, it is presumed that both devices may be out of range. Therefore, no vehicle function may be desired based on a lack of proximity between the user and vehicle 24.

In step 718, BCM 42 may determine or identify which of the wireless devices 22a or 22b has a wireless signal strength that is greater than the threshold. For example, as in other implementations, BCM 42 may be configured with application instructions, hardware logic, or a combination thereof enabling it to select which device is sufficiently proximate to vehicle 24. When identified, the wireless signal from the other wireless device may be ignored (or discounted—i.e., not considered). Thereafter, the method proceeds to step 720.

In step 720, the proximity may be determined using a single wireless device (e.g., either 22a or 22b). This may be similar to step 712—described above—except that the determination is based on one device rather than two. Following step 720, the method may proceed to step 714 again and thereafter end. Step 714 which follows step 720, may be the same as that described above.

Other implementations of method 700 also exist. For example, the method could use more than two wireless devices. For example, three or more devices could be associated with a single or common user. In such instances, step 708 could require at least two of the three or more devices to be greater than their respective thresholds. Similarly, in step 710, the BCM 42 could average the signal strengths of more than two devices.

In embodiments calculating the wireless signal strengths of three or more wireless devices (e.g., associated with the same user), the BCM 42 could calculate a mean value (e.g., instead of an average). Or with three or more devices, an outlier may be removed from any calculation or determination. For example, a received wireless signal which is correlated to a proximity or distance from the sensor 72 which provides an inconsistent proximity result when compared with the remaining wireless signal strengths could be omitted as the outlier.

In another embodiment, some of the wireless devices may communicate via BLE while others may communicate via Bluetooth or some other suitable SRWC protocol. For example, keyfob 22c could communicate via Bluetooth, while a mobile device 22a and a watch 22b could communicate via BLE.

In another embodiment, the transponder 22d may have a preconfigured range associated therewith which may be used to calibrate the relative proximity of other wireless devices. For example, in one implementation, the range of the transponder 22d may be 100 meters. Thus, where the device 22d responds to a wireless signal sent from vehicle 24 (e.g., via BLE module 74 or sensors 72), any other wireless device signals received also at that approximate moment in time may be assumed to be at 100 meters as well. Thus, in the BCM learn mode previously described, the BCM may determine or correlate signal strengths of devices 22a, 22b, 22c, etc. to the same distance (e.g., 100 meters).

Figure 8:
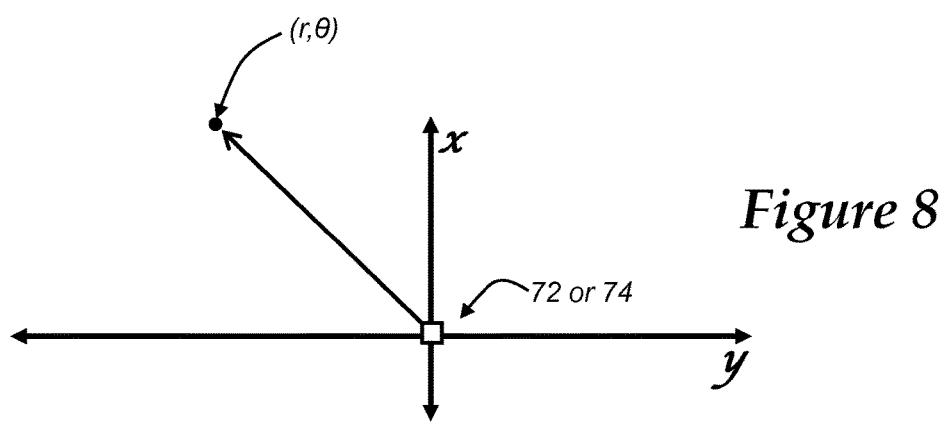
FIG. 8 is a schematic diagram of a vehicle sensor or BLE module depicted on a coordinate plane.

In another embodiment, the BLE module 74 and/or sensor(s) 72 may utilize other detection techniques—e.g., aside from signal strength determinations. For example, module 74 and/or sensor(s) 72 may be configured to determine an angle-of-arrival (see for example, FIG. 8). Thus, the module 74, sensor 72, or both may be able to determine a polar coordinate for a vehicle user; e.g., a magnitude or radius (r) (e.g., based on wireless signal strength) and an angular value (θ) relative to the x- or y-axis. Thus, using a single device 72/74, the position of the user may be determined using one or more wireless device signals. Using additional sensors 72 (or sensor(s) and the BLE module 74), the BCM 42 may determine proximity and/or position with redundancy.

In another embodiment, the BLE module 74 and/or sensor(s) 72 may utilize a time-of-flight technique to determine proximity. For example, the proximity of the user (via device 22a, 22b, 22c, 22d, etc.) may be determined based upon how long a wireless transmission takes to reach the BLE module 74 or sensor 72. For example, BLE module 74 (or sensor 72) may have a clock which can be synchronized with a clock of the wireless device 22a, 22b, 22c, 22d, etc., and the sending device 22a, 22b, 22c, 22d, etc. may transmit a response signal with a timestamp. The recipient device 72/74 may then determine the transmission time or time-of-flight. Based on this determined time (and a known travel speed—e.g., the speed of light), the distance of the sending device may be determined. Both angle-of-arrival and time-of-flight techniques may be used singly or in combination with one other or in combination with other signal strength techniques discussed above.

In other implementations, the same techniques described above can be applied to a user within vehicle 24. For example, determining a location of a user carrying two wireless devices within the vehicle 24 may be used to improve the user experience as well—e.g., determinable locations include a driver seat, a front passenger seat, one of a plurality of rear passenger seats, etc. This may include improved or customized driver-assisted features, improved or customized infotainment services to passengers, etc., just to name a couple examples.

Thus, there has been described a method for determining a location/proximity of a vehicle user carrying two or more wireless devices. The location may be exterior to the vehicle or within the vehicle. The method includes linking two or more wireless devices to the vehicle and then receiving a wireless signal from each of the devices. The method may determine whether to perform one or more mathematical computations using the signal strengths of the received wireless signals. In one implementation, an average signal strength is determined. In another implementation, at least one wireless signal strength is omitted from any determination. And in some instances other techniques may be used (e.g., angle-of-arrival and/or time-of-flight techniques). Ultimately, based on the received wireless signals, the proximity, location, or both is determined of a user associated with the two or more wireless devices. Thereafter, a vehicle function is performed at least partially in response to the determination.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of performing a vehicle function based on a proximity of a plurality of wireless devices to a vehicle, comprising the steps of:

establishing a short-range wireless communication (SRWC) link between a SRWC system on the vehicle and a first wireless device;

establishing another SRWC link between the SRWC system and a second wireless device, wherein the first and second wireless devices are associated with a common user;

receiving a wireless signal at the SRWC system from each of the first and second wireless devices;

determining a proximity of the two wireless devices based on receiving the wireless signals; and performing a vehicle function based on the determined proximity.

2. The method of claim 1, wherein at least one of the SRWC links is a Bluetooth Low Energy (BLE) link, wherein the SRWC system is a BLE system comprising a plurality of sensors located on the vehicle.

3. The method of claim 1, wherein the first wireless device is one of a mobile device, a portable wireless transceiver, or a radio frequency (RF) transponder tag, wherein the second wireless device is one of a mobile device, a portable wireless transceiver, or a radio frequency (RF) transponder tag.

4. The method of claim 1, further comprising associating wireless device parameters with each of the first and second wireless devices, wherein one of the parameters for each of the first and second wireless devices is a wireless device identifier (ID).

5. The method of claim 4, wherein another one of the parameters of each of the first and second wireless devices includes a signal strength parameter.

6. The method of claim 4, wherein at least one of the wireless device IDs is received by the SRWC system during one of the establishing steps or wherein at least one of the wireless device IDs is received by the SRWC system from a vehicle backend system.

7. The method of claim 1, wherein the determining step further comprises determining one or more of the following:
a wireless signal strength associated with at least one of the two wireless devices;
a wireless signal angle-of-arrival associated with at least one of the two wireless devices; or
a wireless signal time-of-flight associated with at least one of the two wireless devices.

8. The method of claim 7, wherein at least one of the wireless signal strengths, at least one of the wireless signal angle of arrivals, at least one of the wireless signal time of flights, or a combination thereof is used to determine a location of at least one of the two wireless devices with respect to the vehicle.

9. The method of claim 8, wherein determining the location includes triangulating the location of at least one of the two wireless devices with respect to the vehicle.

10. The method of claim 8, wherein the location comprises a zone proximate the vehicle.

11. The method of claim 8, wherein the location comprises an (x, y) position on a coordinate plane in which the vehicle is positioned at the origin, wherein a y-axis of the vehicle coincides with a longitudinal axis of vehicle and an x-axis of the vehicle coincides with an axis transverse to the longitudinal axis.

12. A method of performing a vehicle function based on a proximity of a wireless devices to a vehicle, comprising the steps of:
establishing a short-range wireless communication (SRWC) link between a SRWC system on the vehicle and a first wireless device;
establishing another SRWC link between the SRWC system and a second wireless device, wherein the first and second wireless devices are associated with a common user;
receiving a wireless signal at the SRWC system from each of the first and second wireless devices;
determining a proximity of the two wireless devices based on receiving the wireless signals; and
performing a vehicle function based on the determined proximity;
wherein the determining step further comprises:
determining a wireless signal strength of the wireless signals received from each of the first and second wireless devices;
determining whether the wireless signal strength of the first wireless device is greater than a first threshold;
determining whether the wireless signal strength of the second wireless device is greater than a second threshold;
when the signal strength of the first wireless device is not greater than the first threshold or the signal strength of the second wireless device is not greater than the second threshold, then, when determining the proximity of the two wireless devices, ignoring the signal strength which does not exceed the first or second threshold; and
when the signal strength of the first wireless device is greater than the first threshold and the signal strength of the second wireless device is greater than the second threshold, then performing a mathematical computation using the signal strengths to determine the proximity of the two wireless devices.

13. The method of claim 12, further comprising normalizing at least one of the signal strengths of the two wireless devices prior to performing the mathematical computation.

14. The method of claim 1, wherein the vehicle function includes at least one of the following: a vehicle ignition actuation, a vehicle door lock actuation, a vehicle panic alarm actuation, or a vehicle door, trunk, or hood actuation.

15. A method of performing a vehicle function based on proximity of a plurality of wireless devices to a vehicle, comprising the steps of:
establishing a short-range wireless communication (SRWC) link between a Bluetooth Low Energy (BLE) system and a first wireless device, wherein the SRWC link is established via a plurality of BLE sensors located on the vehicle;
establishing a SRWC link between the BLE system and a second wireless device, wherein the SRWC link is established via the plurality of BLE sensors;
receiving a wireless signal at the BLE system from each of the first and second wireless devices via the plurality of BLE sensors;
determining a proximity of a user associated with the two wireless devices by averaging the signal strengths of the wireless signals received in the receiving step; and
performing a vehicle function based on the proximity determination.

16. The method of claim 15, wherein the determining step does not average the signal strengths when the signal strength of the first wireless device does not exceed a first threshold or when the signal strength of the second wireless device does not exceed a second threshold.

17. The method of claim 15, wherein the first wireless device is one of a mobile device, a portable wireless transceiver, or a radio frequency (RF) transponder tag, wherein the second wireless device is one of a mobile device, a portable wireless transceiver, or a radio frequency (RF) transponder tag.

* * * * *